United States Patent

[11] 3,618,995

| [72] | Inventor | Allan D. McLean |
| | | Seattle, Wash. |
| [21] | Appl. No. | 45,184 |
| [22] | Filed | June 10, 1970 |
| [45] | Patented | Nov. 9, 1971 |
| [73] | Assignee | Pacific Car and Foundry Company |
| | | Bellevue, Wash. |

[54] OVER CENTER RUBBER HOOD HOOK
9 Claims, 3 Drawing Figs.

[52] U.S. Cl............................................ 292/66,
292/113, 292/247, 292/252, 292/DIG. 49
[51] Int. Cl.......................................... E05c 5/00,
E05c 19/14
[50] Field of Search............................................ 292/65, 66,
113, 114, 241, 247, 252, 256, 256.5, 256.69, 257,
DIG. 31, DIG. 49

[56] References Cited
UNITED STATES PATENTS

| 960,961 | 6/1910 | Kusterer........................ | 292/247 |
| 1,400,953 | 12/1921 | Hennicke........................ | 292/247 |
| 3,021,162 | 2/1962 | Jahn.............................. | 292/66 |
| 3,400,963 | 9/1968 | Jablonski....................... | 292/247 |

*Primary Examiner*—Robert L. Wolfe
*Attorney*—Seed, Berry & Dowrey

ABSTRACT: A latching means for use upon the hood of a vehicle. The latch has a ball and socket interlock with definitive camming surfaces and the elements are so interrelated that the latching action includes an over center movement. The over center movement of the latch allows for greater latch security with far less operator effort. In most installations, the operating force required to operate this latch is horizontal, away from the body, as opposed to a vertical force at arms length that is required on latches without this over center feature.

PATENTED NOV 9 1971 3,618,995

ALLAN D. MCLEAN
INVENTOR.

BY *Seed, Berry & Dowrey*

ATTORNEYS

OVER CENTER RUBBER HOOD HOOK

BACKGROUND OF THE INVENTION

It is well known in the art to use latching members for securing various elements of vehicles together when these elements must, for reasons of service and/or other access, be periodically opened and closed. The standard construction includes one element of the latching mechanism mounted upon one of the portions intended to be latched together and a second of the latching elements mounted on the other portion intended to be latched. Generally, the latching procedure has involved the use of brute strength to extend one of the members to secure it in position over the other member assuring retention during vibration. The use of an extendable member has been found to be most desirable in view of the fact that it is readily useable in areas where close tolerance fitting is not the general practice and can be adjusted because of its extendability to accommodate a wide variety of fits.

With the above noted facts in mind, it is an object of the present invention to provide a latch wherein the elements of the structure include at least one element which is extendable to account for variations in fit and further to provide a hood latch or the like wherein the energy needed to secure the elements together is substantially reduced while the securing force is substantially increased.

In accordance with this object and as a feature of the present invention, there is provided a latch for use on the hood of a truck or the like wherein one of the elements of the latch is secured to the relatively fixed portion and is manufactured of an extendable elastomeric material. The extendable portion has mounted thereon an over center handle mechanism having a ball-shaped portion having definitive cam surfaces on the end and a handle portion on the other end, said handle being pivotally secured to the extendable linking member. Mounted upon the other portion of the element to be secured, i.e. the relatively moveable one, is a socket-shaped latch member which is adapted to be engaged by a camming surface on the surface of the ball of the handle member. The handle is pushed through the over center movement until it is locked, adjacent to and overlying the latch member. It can thus be seen that the holding force is greatly increased without an undue increase in the force necessary to secure the latch.

DETAILED DESCRIPTION OF THE DRAWINGS

Figure 1:
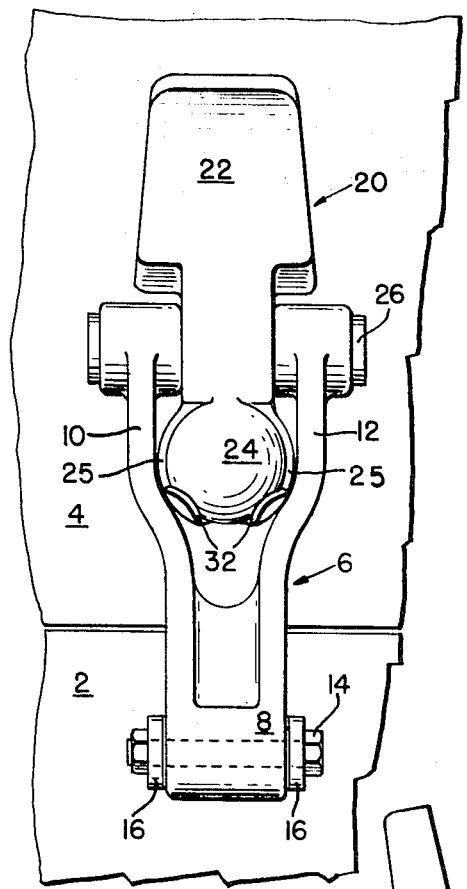
FIG. 1 is a plan view of the inventive latch structure in its interlocked and in closed position.

As seen in the FIGS., the latch structure is adapted to be mounted on two elements which must be latched and secured in close proximity. For purposes of illustration and not limitation the latch structure would well be used on the hood of a truck wherein the one portion would be secured to the body 2 and the other portion would be secured to the hood 4 of the vehicle.

As noted above, the use is merely illustrative and the latch structure could equally well be used on any sort of a container such as a freight container wherein it is necessary to secure the portions together and hold them fast in the closed position. Likewise, the latch structure could be used on such things as hatch covers on ships and the like.

The latch structure itself comprises an extendable elastomeric linking member 6 which is substantially of "Y" configuration having a base portion 8 and a pair of arms 10 and 12. The base portion 8 is secured to the structural element 2 by means of a bolt 14 which passes through upstanding ears 16 of a mounting bracket 18 which is appropriately secured to the first element 2 by screws or the like. Linking member 6 has attached thereto between the arms 10 and 12, a handle 20 which has a hand engaging portion 22 and a substantially ball-shaped opposite portion 24. The handle 20 is secured in a position between the arms 10 and 12 of the linking members 6 by means of a pivotal connection comprising a shaft 26 which passes through each of the arms 10 and 12 as well as through the handle 20. It is to be noted that the hand-engaging portion 22 and the substantially ball-shaped portion 24 lie on opposite sides of the pivotal connection allowing the use of the handle in the fashion of a simple lever, the fulcrum located at the shaft 26.

Located upon diametrically opposing sides of the ball-shaped portion 24, said diameter being approximately parallel to the shaft 26, are a pair of camming surfaces 25. The camming surfaces 25 are identical and only one is shown and described. The camming surfaces 25 comprise radially outwardly extending portions providing an upstanding cam surface having an irregular outline.

Figure 3:
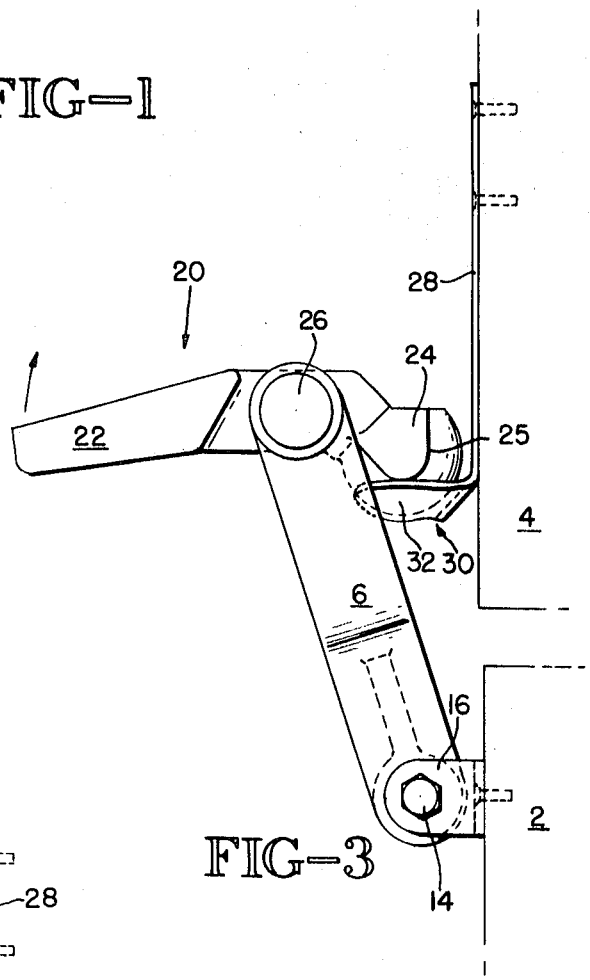
FIG. 3 is a side view of the inventive latch structure shown in the intermediate latching stage.
Figure 2:
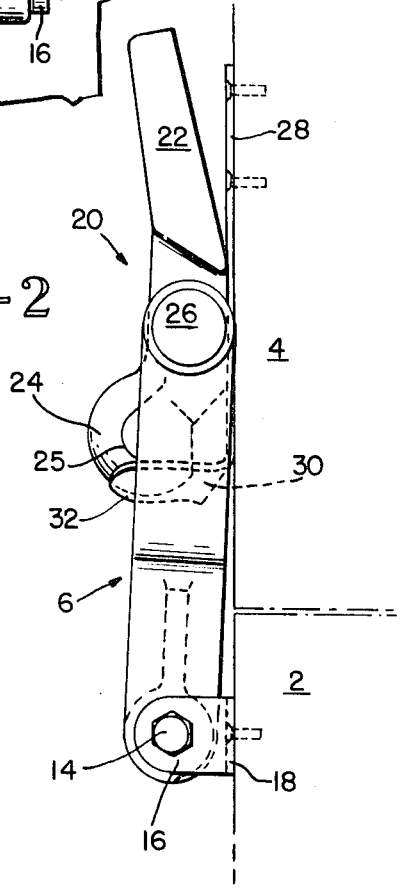
FIG. 2 is a side view of the latch structure as shown in FIG. 1.

As best seen in FIGS. 2 and 3, there is attached to the other portion of the structure which is to be secured in position, a latch-receiving member 28 fastened to the portion by means of screws or the like and having a main portion lying substantially parallel to the portion 4 and contiguous therewith. The latch engaging portion 28 has at the end most closely associated with the linking member 6 a socket portion 30 which socket is effectively formed by a pair of upstanding arcuate ears 32.

In operation, the two portions of the structure to be latched, 2 and 4, would be placed in close proximity and the ball 24 of the handle portion 20 would be placed within the socket 30 of the latch-receiving means 28, the cam surfaces 25 contacting the edge of the ears 32, FIG. 3. The hand-engaging portion 22 of the handle 20 would extend outwardly from the surface, shown as substantially perpendicular to the surface (see FIG. 3) to which the latch-receiving portion is secured. Once the cam surfaces 25 of the ball 24 are in engagement with the ears 32 of the socket 30, pressure is placed upon the handle portion 22 in direction of the arrow and the handle is forced to a position substantially as shown in FIG. 3. During the movement of the hand-engaging portion from that position shown in FIG. 3 to that position shown in FIG. 2, the linking member 6 must necessarily extend pulling the portion 2 and 4 into positive engagement and providing sufficient pressure acting along the line parallel to the surface of portions 2 and 4 to hold them in continuous engagement after the hand-engaging means 22 is released.

The cam surface 25 upon the exterior of the ball 24 is designed to increase the over center effect of the latching mechanism by providing contact with a surface of lesser radius than that of the ball and a continuously changing radius which defines the over center movement.

As can best be seen in FIG. 2, the pressure exerted by the extended link 6 would tend to pull the shaft 26 toward the bolt 14. The ball 24 engaging the socket 30 prevents such movement and tends to cause a pivotal movement of the handle 20 about a fulcrum at the engagement point of ball 24 and socket 30. Because of the over center structural configuration, the pivotal forces acts to hold the handle 20 against accidental dislodgement of the latch.

As seen in FIG. 3, the two elements to be latched 2, 4 are in a separated condition. As the handle 20 is moved in the direction of the arrow, the linking element 6 tends to stretch drawing the portions 2 and 4 into substantially uniform contact as seen in FIGS. 1 and 2. The structure is mounted, as noted above, so that the linking element 6 is under tension when the elements are in latched condition.

The embodiments of the invention in which an exclusive property or privilege is claimed are defined as follows:

1. A latch for drawing and securing two elements together using the over center principal comprising; substantially socket shaped latch receiving means comprising a pair of spatially located arcuate ears adapted to be secured to one of the elements, extendable linking means pivotally attached to the other of the elements, and handle means pivotally attached to the linking member and having a first and adapted to be hand engaging and a second substantially ball shaped end including camming surfaces integral therewith for cooperation with the latch-receiving means whereby the ball can be engaged with the socket and the handle member pivoted about the ball latching the two elements together.

2. A latch as in claim 1 wherein the linking means is substantially Y-shaped and adapted to be attached to the element to be latched at the foot of the Y and the handle means is attached to and positioned between the two arms of the Y.

3. A latch as in claim 2 wherein the latch is so designed that when in the latched position the socket of the latch-receiving means and the ball portion of the handle means lie between the arms of the Y.

4. A latch as in claim 1 wherein the linking means is a one-piece elastomeric element.

5. A latch as in claim 1 wherein the handle means, when latched, is biased against the surface of the element supporting the latch-receiving means.

6. A latch as in claim 1 wherein the ball-shaped end portion has camming surfaces integral therewith for cooperation with the latch-receiving means.

7. A latch as in claim 1 wherein the outermost surface of the ears cooperate with the camming surface of the ball-shaped end portion.

8. A latch as in claim 6 wherein the camming surfaces are radially outwardly extending and have an irregular shape.

9. A latch for drawing and securing two elements together using the over center principal comprising;
  substantially socket-shaped latch-receiving means adapted to be secured to one of the elements,
  extendable one-piece elastomeric linking means pivotally attached to the other of the elements, and
  handle means pivotally attached to the linking member and having a first end adapted to be hand engaging and a second ball-shaped end having radially outwardly protruding camming surfaces having an irregular profile adapted to be engaged by the edges of the socket whereby the ball can be engaged with the socket and handle member pivoted about the ball latching the two elements together.

* * * * *